(12) United States Patent
Nagasawa

(10) Patent No.: US 10,562,480 B2
(45) Date of Patent: Feb. 18, 2020

(54) ARM REST

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 114 days.

(21) Appl. No.: 15/873,208

(22) Filed: Jan. 17, 2018

(65) Prior Publication Data

US 2018/0281724 A1 Oct. 4, 2018

(30) Foreign Application Priority Data

Mar. 31, 2017 (JP) .................................. 2017-070879

(51) Int. Cl.
*B60R 21/18* (2006.01)
*B60R 21/207* (2006.01)
(Continued)

(52) U.S. Cl.
CPC ................ *B60R 21/18* (2013.01); *B60N 2/79* (2018.02); *B60R 21/055* (2013.01);
(Continued)

(58) Field of Classification Search
CPC . B60R 21/18; B60R 21/207; B60R 2021/022; B60N 2/79
See application file for complete search history.

(56) References Cited

U.S. PATENT DOCUMENTS 2,861,626 A * 11/1958 Mills, Jr. ................. B60R 21/02
280/748
3,623,768 A * 11/1971 Capener ............... B60R 21/207
297/330

(Continued)

FOREIGN PATENT DOCUMENTS

DE 198 50 756 A1 5/2000
JP S58-44247 U1 3/1983
(Continued)

OTHER PUBLICATIONS

Kouichi et al., Airbag Device for Restraining Passengers, Sep. 17, 1990, JPO, JP 02-115746 U, English Translation of Specification (Year: 1990).*

(Continued)

*Primary Examiner* — James A English
(74) *Attorney, Agent, or Firm* — Smith, Gambrell & Russell, LLP

(57) ABSTRACT

An arm rest attachable to a seat for a vehicle occupant to sit on includes a pair of side members, a front member, and an airbag. The pair of side members are configured to be at left and right sides of the vehicle occupant when the vehicle occupant is seated. The side members extend in a front-rear direction and are coupled to the seat. The front member is configured to be in front of the vehicle occupant when the vehicle occupant is seated and is coupled to at least one of the pair of side members. The airbag is configured to deploy toward the vehicle occupant from the front member. When the vehicle occupant comes into contact with the deployed airbag, the airbag is supported by a reactive-force member from which a reactive force is obtained as a result of the airbag abutting on the reactive-force member.

20 Claims, 3 Drawing Sheets

(51) Int. Cl.
*B60N 2/75* (2018.01)
*B60R 21/055* (2006.01)
*B60R 21/02* (2006.01)
*B60R 21/2338* (2011.01)

(52) U.S. Cl.
CPC ............ *B60R 21/207* (2013.01); *B60N 2/767* (2018.02); *B60R 2021/022* (2013.01); *B60R 2021/0293* (2013.01); *B60R 2021/23382* (2013.01)

(56) References Cited

U.S. PATENT DOCUMENTS

| | | | | |
|---|---|---|---|---|
| 5,375,908 | A * | 12/1994 | Goor | B60R 21/01 |
| | | | | 297/216.11 |
| 5,492,361 | A * | 2/1996 | Kim | B60R 21/02 |
| | | | | 280/730.1 |
| 5,511,850 | A * | 4/1996 | Coursey | B60N 2/2839 |
| | | | | 280/730.1 |
| 5,730,458 | A * | 3/1998 | Byon | B60R 19/00 |
| | | | | 280/730.2 |
| 6,315,245 | B1 * | 11/2001 | Ruff | B64D 25/02 |
| | | | | 244/122 AG |
| 6,736,455 | B1 * | 5/2004 | Zakovic | B60N 2/2839 |
| | | | | 297/256.15 |
| 10,232,815 | B1 * | 3/2019 | Dry | B60R 21/18 |
| 10,272,865 | B2 * | 4/2019 | Nagasawa | B60R 21/18 |
| 2019/0023214 | A1 * | 1/2019 | Kitagawa | B60R 21/207 |
| 2019/0077359 | A1 * | 3/2019 | Kim | B60R 21/23138 |

FOREIGN PATENT DOCUMENTS

| | | |
|---|---|---|
| JP | H02-57737 U1 | 4/1990 |
| JP | H02-115746 U1 | 9/1990 |
| JP | H09-99793 A | 4/1997 |
| JP | 2005-125944 A | 5/2005 |
| JP | 2009-12661 A | 1/2009 |
| JP | 2016-199123 A | 12/2016 |

OTHER PUBLICATIONS

Office Action received in Japanese Patent Application No. 2017-070879 on Nov. 13, 2018 (4 pages in Japanese with English translation).

* cited by examiner

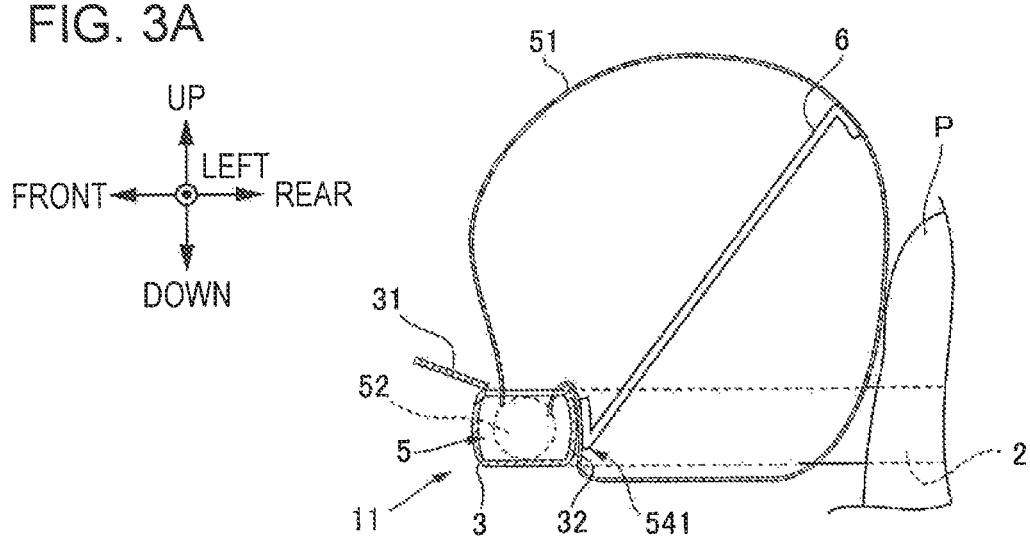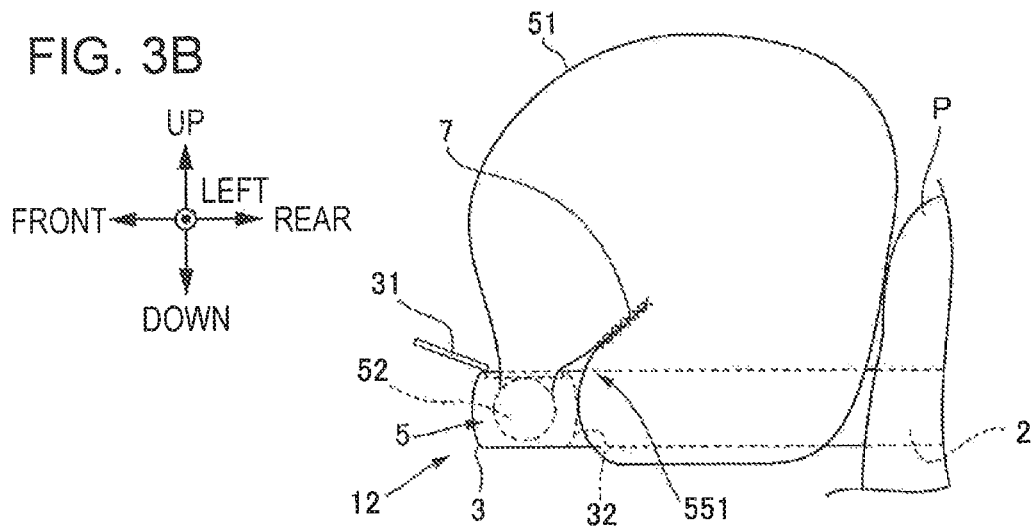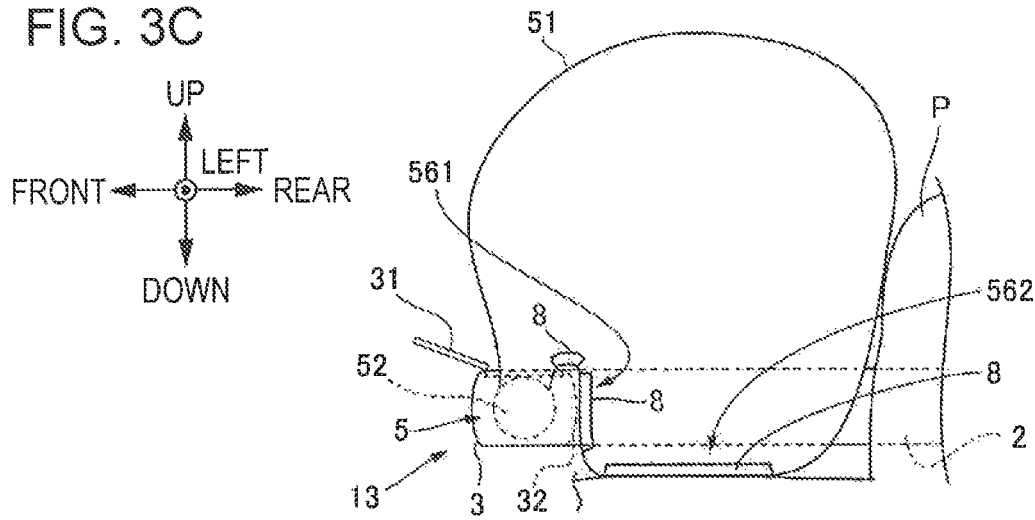

ARM REST

CROSS-REFERENCE TO RELATED APPLICATIONS

The present application claims priority from Japanese Patent Application No. 2017-070879 filed on Mar. 31, 2017, the entire contents of which are hereby incorporated by reference.

BACKGROUND

1. Technical Field

The present invention relates to arm rests, and particularly, to an arm rest that quickly and reliably protects a vehicle occupant by using an airbag having a lower capacity than in the related art.

2. Related Art

Various airbags for protecting vehicle occupants, such as drivers, have been developed. For instance, a vehicle driver-seat airbag device disclosed in Japanese Unexamined Patent Application Publication No. 2016-199123 includes a main chamber that deploys in front of the driver and sub chambers that deploy at the lateral sides of the main chamber. With the main chamber and the sub chambers, the driver can be prevented from moving diagonally forward in the event of a collision.

However, for instance, since the front airbag to be deployed from the steering wheel is deployed from a member located distant from the vehicle occupant, there is a demand to improve the restraining effect with respect to the size of the airbag. Specifically, there is room for improvement with respect to the position and the restraining method of a large-capacity airbag that reaches the seated area of the vehicle occupant once the airbag is deployed. The use of an arm rest as a vehicle-occupant protection member is nonexistent or rare.

SUMMARY OF THE INVENTION

It is desirable to provide an arm rest that can quickly and reliably protect a vehicle occupant by using an airbag having a lower capacity than in the related art.

An aspect of the present invention provides an arm rest to a seat for a vehicle occupant to sit on and that includes a pair of side members, a front member, and an airbag. The pair of side members are configured to be at left and right sides of the vehicle occupant when the vehicle occupant is seated. The side members extend in a front-rear direction and are coupled to the seat. The front member is configured to be in front of the vehicle occupant when the vehicle occupant is seated and is coupled to at least one of the pair of side members. The airbag is configured to deploy toward the vehicle occupant from the front member. When the vehicle occupant comes into contact with the deployed airbag, the airbag is supported by a reactive-force member from which a reactive force is obtained as a result of the airbag abutting on the reactive-force member.

BRIEF DESCRIPTION OF THE DRAWINGS

FIGS. 3A to 3C are side views schematically illustrating arm rests according to other examples of the present invention.

DETAILED DESCRIPTION

Basic Example

An arm rest according to an example of the present invention will be described below with reference to FIGS. 1A, 1B, and 2.

Figure 1A:
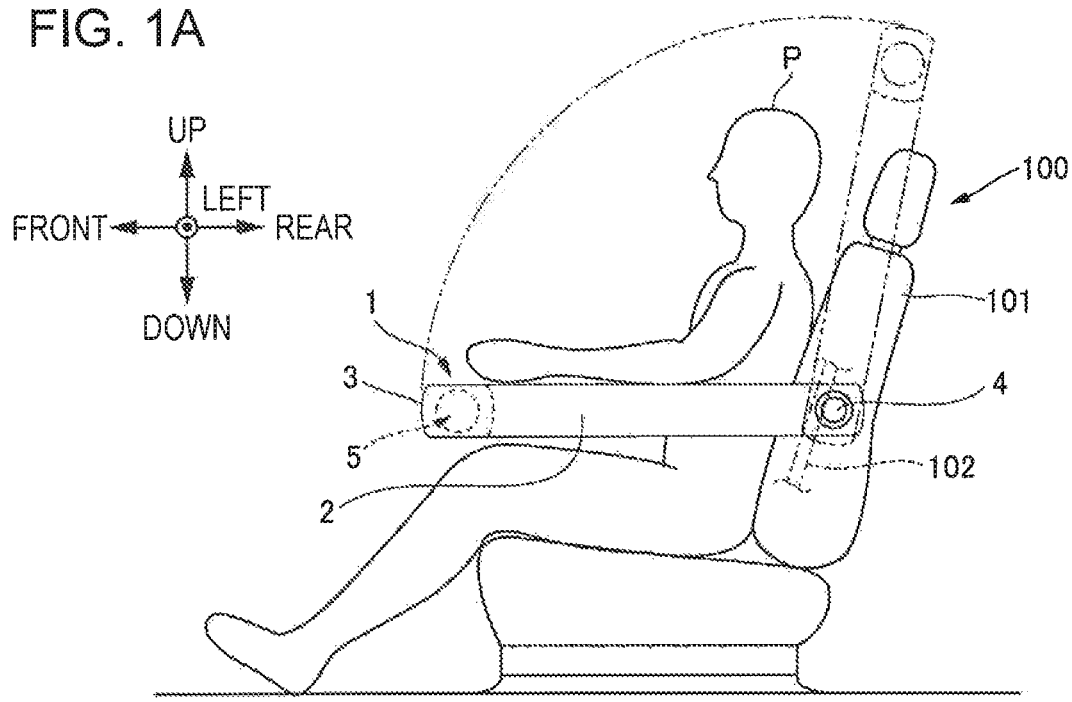
FIGS. 1A and 1B schematically illustrate a seat equipped with an arm rest according to an example of the present invention, FIG. 1A being a side view schematically illustrating the seat, FIG. 1B being a plan view schematically illustrating the seat.

FIGS. 1A and 1E schematically illustrate a seat 100 equipped with an arm rest 1 according to an example of the present invention. FIG. 1A is a side view schematically illustrating the seat 100, and FIG. 1B is a plan view schematically illustrating the seat 100. FIG. 2 is a side view schematically illustrating the seat 100 equipped with the arm rest 1 from which an airbag according to an example of the present invention is deployed.

Figure 1B:
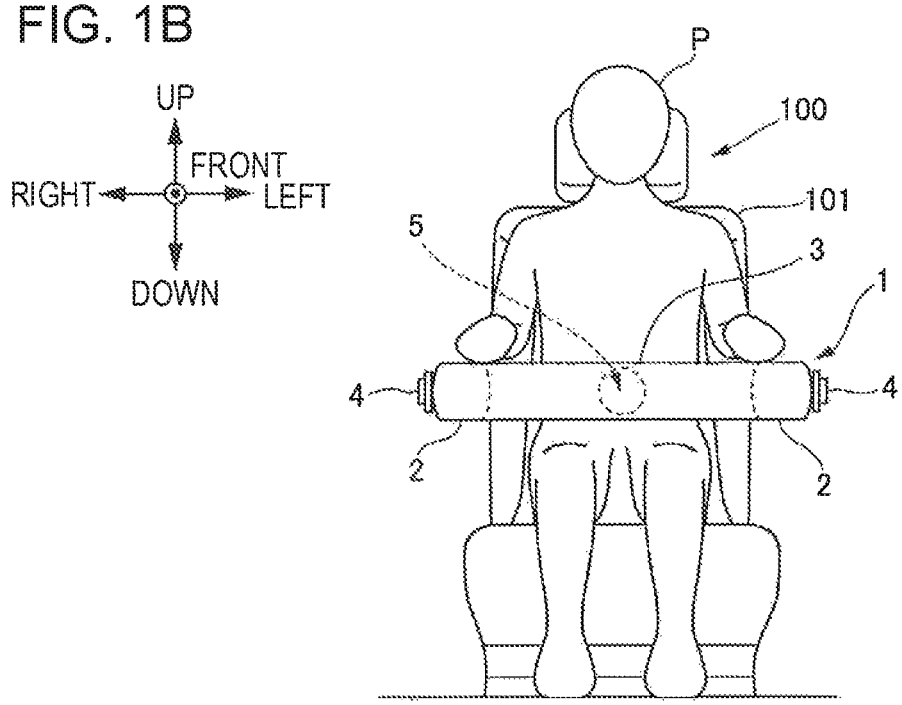

As illustrated in FIGS. 1A and 1B, the arm rest 1 is attached to the seat 100 and has side members 2, a front member 3, a rear member 4, and an airbag 5.

The side members 2 are provided as a pair at the left and right sides of a vehicle occupant P and are tubular members extending substantially parallel to the front-rear direction. The extending direction of the side members 2 may be slanted to a certain extent relative to the front-rear direction so long as the extending direction is substantially parallel to the front-rear direction.

The front member 3 is a tubular member provided in front of the vehicle occupant P. In particular, as illustrated in FIG. 1A, the front member 3 couples the front ends of the left and right side members 2 to each other at least when in use, as indicated by a solid line. In this example, the side members 2 and the front member 3 are integrated such that the front sides of the side members 2 are coupled to each other not only when in use but also when not in use, such as when the vehicle is parked and when the vehicle occupant P moves away from the seat 100 to exit the vehicle.

In an example of the present invention, the front member 3 is not particularly limited so long as an airbag to be described later can be accommodated in and deployed from the front member 3. The front member 3 may be coupled to at least one of the pair of left and right side members and does not have to be coupled to both of the pair of side members.

The rear member 4 is coupled to the seat 100 and to the rear ends of the side members 2. The rear member 4 according to this example is a shaft member extending through a seat back 101 in the left-right direction. The left and right ends of the rear member 4 that are exposed from the seat back 101 are respectively coupled to the side members 2. The rear member 4 is securely attached to a seat frame 102 disposed within the seat back 101 so as to be immovable in the front-rear direction, the left right direction, and the up-down direction of the vehicle.

The airbag 5 is provided substantially at the center of the front member 3 in the left-right direction and is accommodated inside the front member 3 used as an accommodation member. The airbag 5 is to be deployed toward the vehicle occupant P. A description of the deployment method of the airbag 5 will be provided later with reference to FIG. 2 illustrating the airbag 5 in its deployed state.

The side members 2 and the front member 3 are rotatable about a line that connects left and right coupled points between the rear member 4 and the seat back 101. The line connecting the left and right coupled points is substantially parallel to and substantially aligned with the central axis of the rear member 4. In this example, the rear member 4 functions as a hinge. Thus, the side members 2 and the front member 3 when not in use are rotated upward so as not to interfere with the boarding and exiting process of the vehicle occupant P. Moreover, when in use, the side members 2 and the front member 3 are rotated downward so that the side members 2 are set substantially parallel to the horizontal direction after the vehicle occupant P is seated, thereby allowing the vehicle occupant P to place his/her arms on the arm rest 1.

The side members 2, the front member 3, and the rear member 4 according to this example are provided as rigid members. By having rigidity, the side members 2 and the front member 3 are less likely to deform even when an incoming object comes into contact with the members in the event of a collision, thus protecting the vehicle occupant P. In addition, the rear member 4 is less likely to become detached from the seat 100 when an incoming object comes into contact with the side members 2 in the event of a collision.

As illustrated in FIGS. 1A and 1B, the side members 2, the front member 3, and either one of the rear member 4 and the seat 100 containing the rear member 4 constitute a ring-shaped structure that is substantially rectangular in plan view. Accordingly, when the arm rest 1 is being used, the vehicle occupant P is in a surrounded state. Therefore, even if the vehicle cabin deforms in the event of a forward collision, an oblique collision, a lateral collision, and so on and an incoming object occurs in the vehicle cabin, the vehicle occupant P can be directly protected from the incoming object since the arm rest 1 is disposed between the incoming object and the vehicle occupant P. In particular, in the event of an oblique collision and a lateral collision, door components and vehicle-body components tend to enter the vehicle cabin as incoming objects. Even if a door component deforms into the vehicle cabin, the arm rest 1 equipped with the side members 2 and the front member 3 can suppress or prevent direct contact of the door component with the vehicle occupant P.

Because the rear member 4 is fixed to the seat frame 102 in this example, the arm rest 1 is less likely to be positionally displaced by, for instance, an impact caused by a collision. Moreover, even if an incoming object in the vehicle cabin hits against the arm rest 1, the arm rest 1 can exhibit a reactive force against the incoming object.

In a case where the arm rest 1 is applied to a vehicle equipped with either one of an automated driving system and a driving support system, the side members 2 and the front member 3 preferably have a shape such that the arms of the vehicle occupant P, a book, an electronic terminal, and so on can be placed or are readily placeable on the side members 2 and the front member 3. Moreover, as an alternative to the example illustrated in FIGS. 1A and 1B in which the rear member 4 is a single shaft member, the rear member 4 according to this example of the present invention may be split members and does not have to extend through the seat back 101.

Figure 2:
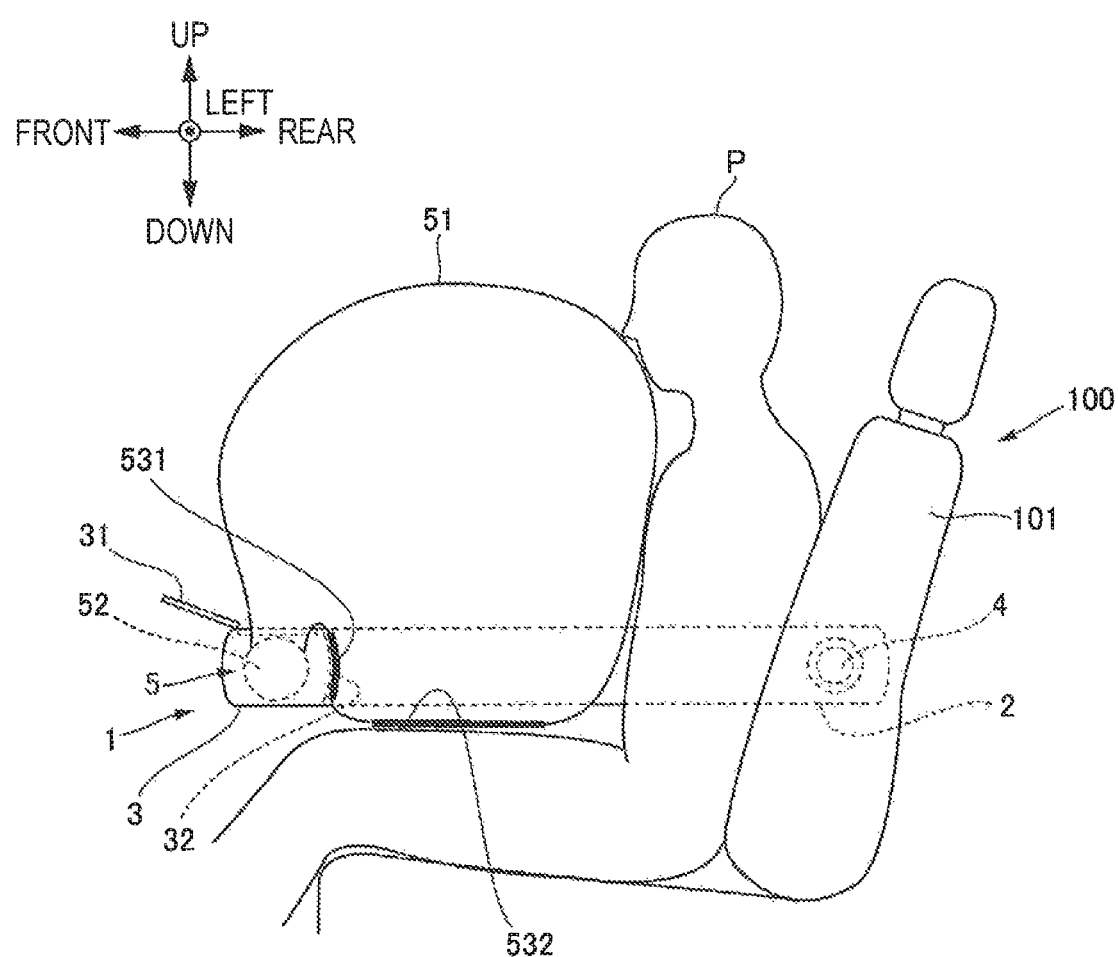
FIG. 2 is a side view schematically illustrating the seat equipped with the arm rest from which an airbag according to an example of the present invention is deployed.

In the arm rest 1 illustrated in FIG. 2, the airbag 5 is in its deployed state. The airbag 5 deploys toward the vehicle occupant P from the front member 3 and has an airbag body 51, an inflator 52, a first engagement unit 531, and a second engagement unit 532. The airbag 5 is supported by the first engagement unit 531 and the second engagement unit 532.

The airbag body 51 extends to the front side of the upper body of the vehicle occupant P from the front member 3 and deploys by rupturing a region extending from the inner side of the substantially-ring-shaped arm rest 1, that is, the rear surface of the front member 3 facing the vehicle occupant P, to the upper surface of the front member 3.

The inflator 52 is a gas generator provided inside the front member 3 and is driven so as to pressure-feed gas into the airbag body 51.

The first engagement unit 531 is a portion of the airbag body 51 and is to be engaged with the front member 3, The second engagement unit 532 is a portion of the airbag body 51 and is to be engaged with the thighs as portions of the body surface of the vehicle occupant P.

When the airbag 5 deploys and the vehicle occupant P comes into contact with the airbag body 51, specifically, when the vehicle occupant P is pushed forward onto the airbag body 51 due to an impact caused by a collision, the first engagement unit 531 abuts on and engages with the front member 3 as one of reactive-force members, and the second engagement unit 532 abuts on and engages with the thighs of the vehicle occupant P as another reactive-force member.

The airbag 5 according to this example of the present invention abuts on and is supported by the reactive-force members. Each reactive-force member is a member where a reactive force is obtained when the airbag 5 abuts thereon. An example of a reactive-force member is either one of a stationary member and a substantially-stationary member disposed in the vicinity of the airbag 5. An example of a stationary member is a component of the arm rest 11. An example of a substantially-stationary member is a body part of the vehicle occupant P that excludes the upper body abutting on the airbag 5 to push the airbag 5 forward and that is less likely to move by being restrained by a seatbelt and other airbags. For instance, a substantially-stationary member may be either one of the lumbar region and the lower legs. A specific method of how the first engagement unit 531 engages with a rear surface 32 of the front member 3 and the second engagement unit 532 engages with the thighs of the vehicle occupant P, as well as the advantages of the method, will be described later.

Furthermore, the engagement occurring as a result of the airbag 5 abutting on the reactive-force members serving as stationary members in the example of the present invention may be such that the airbag 5 is less likely to detach and come out of abutment with the stationary members at least while the vehicle occupant P is pushing the airbag 5 forward.

A method of how the airbag 5 protects the vehicle occupant P will now be described.

The method of using the airbag 5 involves driving the inflator 52 when a collision occurs or when a collision is predicted so as to pressure-feed gas into the airbag body 51. In this example, an upper surface 31 of the front member 3 is ruptured so that the airbag body 51 accommodated within the front member 3 is deployed toward the vehicle occupant P.

By causing the airbag body 51 to deploy toward the vehicle occupant 3, the airbag body 51 can fill the area between the front member 3 and the vehicle occupant P. Accordingly, in addition to the function of the substantially-ring-shaped arm rest 1 for directly protecting the vehicle occupant P from an incoming object, the vehicle occupant P can be restrained by the airbag 5 so that the vehicle occupant P can be more reliably protected. Since the airbag 5 can be deployed from a position closer to the vehicle occupant P than existing airbags, such as a front airbag from the steering wheel and a curtain airbag from near the roof, the vehicle occupant P can be protected quickly with a low volume of gas.

Since the first engagement unit 531 and the second engagement unit 532 are respectively engaged with the rear surface 32 of the front member 3 and the thighs of the vehicle occupant P while the upper body of the vehicle occupant P is particularly in contact with the airbag body 51, the airbag body 51 is kept in the position and orientation illustrated in FIG. 2. Thus, with the first engagement unit 531 and the second engagement unit 532 in their engaged states, the airbag body 51 can obtain a reactive force against a pushing force received from the vehicle occupant P. Consequently, the airbag body 51 pushed by the vehicle occupant P can achieve a strong and reliable support state from the front.

Engagement units of arm rests according to other examples of the present invention will now be described with reference to FIGS. 3A to 3C.

FIGS. 3A to 3C are side views schematically illustrating arm rests 11, 12, and 13 according to other examples of the present invention. Components similar to those in the example illustrated in FIGS. 1A to 2 will be given the same reference signs, and detailed descriptions thereof will be omitted.

The arm rest 11 illustrated in FIG. 3A is provided with a first engagement unit 541 as an engagement unit.

In the example illustrated in FIG. 3A, the trailing side of the airbag body 51 near the inflator 52 and the leading side of the airbag body 51 when the airbag body 51 deploys upward from the front member 3 are coupled to each other by a tether 6. With the tether 6 sewn to the inner surface of the airbag body 51 at such positions, the airbag body 51 deployed by rupturing the upper surface 31 of the front member 3 changes direction toward the vehicle occupant P located at the rear side, whereby the first engagement unit 541 is formed.

The first engagement unit 541 turns toward the rear surface 32 from the upper side of the front member 3, and the vehicle occupant P pushes the airbag body 51 forward in this state, so that the first engagement unit 541 becomes pressed against and engaged with the rear surface 32.

The first engagement unit 541 is formed by utilizing the momentum of the deploy airbag body 51, and the engagement of the first engagement unit 541 is maintained by the vehicle occupant P pushing against the airbag body 51, so that the reactive force of the airbag body 51 against the pushing force from the vehicle occupant P can be maintained.

Supposing that an appropriate reactive force cannot be obtained due to the airbag body 51 not being engaged with a reactive-force member, a favorable support state of the airbag 5 is not achieved, possibly resulting in a forced orientation change of the vehicle occupant P together with the airbag 5 in another unintended direction.

In this example, the first engagement unit 541 is maintained in engagement with the front member 3 serving as a reactive-force member, so that the vehicle occupant P can be stably supported by the airbag 5.

Next, the arm rest 12 illustrated in FIG. 3B is provided with a first engagement unit 551 as an engagement unit.

In the example illustrated in FIG. 3B, the trailing side of the airbag body 51 near the inflator 52 when the airbag body 51 deploys upward from the front member 3 is provided with a stitched region 7. By providing the stitched region 7 at such a position, the airbag body 51 deployed by rupturing the upper surface 31 of the front member 3 changes direction toward the vehicle occupant P located at the rear side, whereby the first engagement unit 551 having a depressed shape is formed near the stitched region 7. The first engagement unit 551 corresponds to a depression according to an example of the present invention.

The first engagement unit 551 turns toward the rear surface 32 from the upper side of the front member 3, and the vehicle occupant P pushes the airbag body 51 forward in this state, so that the first engagement unit 551 becomes pressed against and engaged with the rear surface 32.

The first engagement unit 551 is formed by forcedly bending the airbag body 51 rearward, and the engagement of the first engagement unit 551 is maintained by the vehicle occupant P pushing against the airbag body 51, so that the reactive force of the airbag body 51 against the pushing force from the vehicle occupant P can be maintained. Thus, the first engagement unit 551 is maintained in engagement with the front member 3 serving as a reactive-force member, so that the vehicle occupant P can be stably supported by the airbag 5.

Next, the arm rest 13 illustrated in FIG. 3C is provided with a first engagement unit 561 and a second engagement unit 562 as engagement units.

In the example illustrated in FIG. 3C, the airbag body 51 has a shape that bulges rearward without largely bulging forward. Specifically, according to normal deployment of the airbag 5, the airbag body 51 deploys to the shape and position illustrated in FIG. 3C. In this case, the first engagement unit 561 turns toward the rear surface 32 from the upper side of the front member 3, and the vehicle occupant P bushes the airbag body 51 forward in this state, so that the first engagement unit 561 becomes pressed against and engaged with the rear surface 32. Moreover, the second engagement unit 562 becomes pressed against and engaged with the thighs of the vehicle occupant P.

In this example, the first engagement unit 561 and the second engagement unit 562 have sewn patches 8 that are exposed on the surface of the airbag body 51 and that are thicker than other regions of the airbag body 51. Thus, the regions having the sewn patches 8 have flexibility while being more rigid than the surrounding regions due to the larger thickness. Specifically, the first engagement unit 561 and the second engagement unit 562 having the sewn patches 8 correspond to rigid units according to an example of the present invention.

When the first engagement unit 561 and the second engagement unit 562 abut on the rear surface 32 of the front member 3 and the thighs of the vehicle occupant P, respectively, the first engagement unit 561 and the second engagement unit 562 deform in conformity to the shapes of the rear surface 32 and the thighs, and the patches B that are more rigid and less likely to deform than normal airbag bodies maintain the first engagement unit 561 and the second engagement unit 562 in abutment with the rear surface 32 and the thighs.

Accordingly, when the airbag body 51 deploys, the airbag body 51 bends rearward due to the shape of the bag, and the engagement of the first engagement unit 561 and the second engagement unit 562 maintained by the vehicle occupant P pushing against the airbag body 51. Thus, the reactive force of the airbag body 51 against the pushing force from the vehicle occupant P can be maintained. The first engagement unit 561 and the second engagement unit 562 are maintained in engagement with the reactive-force members serving as stationary members and substantially-stationary members, so that the vehicle occupant P can be stably supported by the airbag 5.

It is preferable that the exposed surface of each patch 8 be composed of a slip-resistant material so that the engaged state with either one of a stationary member and a substantially-stationary member serving as reactive-force members can be readily and reliably maintained.

As another modification, with regard to the side members of the arm rest according to the example of the present invention, the side member at the door side of the vehicle may be integrated with the door trim. In this case, the front member is split into left and right segments when not in use, and the left and right side members are set in a coupled state when in use. Moreover, the side member at the door side is a stationary member and does not rotate.

Although the examples of the present invention made by the present inventor have been described above, the examples of the present invention are not limited by the description and drawings that constitute a part of the disclosure of the present invention. In other words, it should be noted that other examples, applications, technologies, and so on achievable by a skilled person based on the above examples are all included in the scope of the present invention.

According to the examples of the present invention, an airbag deploys from a front member that is disposed closer to a vehicle occupant than other members disposed in the vehicle, and the deployed airbag abuts on a reactive-force member so as to be supported by the reactive-force member, thereby providing an arm rest that can protect the vehicle occupant quickly and reliably from a close position by using an airbag having a lower capacity than in the related art.

The invention claimed is:

1. An arm rest attachable to a seat for a vehicle occupant to sit on, the arm rest comprising:
   a pair of side members configured to be at left and right sides of the vehicle occupant when the vehicle occupant is seated, the side members extending in a front-rear direction and being coupled to the seat;
   a front member configured to be in front of the vehicle occupant when the vehicle occupant is seated and coupled to at least one of the pair of side members; and
   an airbag configured to deploy toward the vehicle occupant from the front member, said airbag being stored in a central region of the front member such that the airbag deployment originates in a widthwise mid-region between the pair of side members,
   wherein when the vehicle occupant comes into contact with the deployed airbag, the airbag is supported by a reactive-force member from which a reactive force is obtained as a result of the airbag abutting on the reactive-force member.

2. The arm rest according to claim 1, wherein the reactive-force member is either one of the front member and the vehicle occupant, and wherein the airbag comprises an engagement unit configured to engage with the reactive-force member and support the airbag.

3. The arm rest according to claim 2, wherein the engagement unit comprises a depression engageable with the front member.

4. The arm rest according to claim 3, further comprising: a rear member that couples the seat to rear sides of the side members, wherein the side members, the front member, and either one of the rear member and the seat constitute a ring-shaped structure.

5. The arm rest according to claim 3, wherein the engagement unit comprises a rigid unit obtained by partially making the airbag rigid and provided in conformity to a shape of the reactive-force member.

6. The arm rest according to claim 2, further comprising: a rear member that couples the seat to rear sides of the side members, wherein the side members, the front member, and either one of the rear member and the seat constitute a ring-shaped structure.

7. The arm rest according to claim 2, wherein the engagement unit comprises a rigid unit obtained by partially making the airbag rigid and provided in conformity to a shape of the reactive-force member.

8. The arm rest according to claim 7, further comprising:
   a rear member that couples the seat to rear sides of the side members,
   wherein the side members, the front member, and either one of the rear member and the seat constitute a ring-shaped structure.

9. The arm rest according to claim 1, further comprising:
   a rear member that couples the seat to rear sides of the side members,
   wherein the side members, the front member, and either one of the rear member and the seat constitute a ring-shaped structure.

10. The arm rest according to claim 1, wherein the front member comprises a rupture region extending from a rear surface of the front member facing the vehicle occupant and along the upper surface of the front member.

11. The arm rest according to claim 1, wherein the airbag comprises a pair of engagement units each configured to engage with respective reactive-force members and support the airbag.

12. The arm rest according to claim 11, wherein the reactive-force members are, respectively, a rearward side of the front member and the vehicle occupant.

13. The arm rest according to claim 1, wherein the front member includes a tubular member that extends for the full width between front ends of the side members.

14. The arm rest according to claim 13, wherein the tubular member is integrated with each of the front ends.

15. The arm rest according to claim 1, wherein the front member supports, within an interior of the front member, a single, centralized airbag.

16. The arm rest according to claim 1, wherein, when fully deployed and prior to vehicle occupant contact, a lower region of the airbag extends below a lower surface of the front member.

17. The arm rest according to claim 16, wherein the arm rest is ring-shaped and the lower region of the air bag represents a first reactive-force member that is configured to contact with a vehicle occupant thigh region, and wherein a second reactive-force member is provided by an interior side of the front member of the ring-shaped arm rest.

18. The arm rest according to claim 1, wherein the airbag is configured to curl first up and then around downward along an interior side of the front member.

19. The arm rest according to claim 18, wherein a curl inducer induces the curl of the airbag and is a member selected from the group consisting of a tether extending from the interior side of the front member toward an upper region of the airbag,
   a stitched section originating in the airbag at a region between an upper surface and interior side of the front member, or
   a pair of patches positioned on the airbag as to contact the upper surface and interior side of the front member.

20. The arm rest according to claim 19, wherein the curl inducer is the pair of patches and the airbag comprises an additional patch positioned on the airbag for thigh contact of the vehicle occupant following the curl of the airbag.

* * * * *